United States Patent [19]

Saferstein et al.

[11] Patent Number: 4,729,635
[45] Date of Patent: Mar. 8, 1988

[54] HAND-HELD MICROSCOPE

[75] Inventors: Albert Saferstein; Gilbert Spector, both of Purchase; Larry Tsuyuki, Scarsdale, all of N.Y.

[73] Assignee: Innomed Inc., Purchase, N.Y.

[21] Appl. No.: 887,315

[22] Filed: Jul. 21, 1986

[51] Int. Cl.⁴ ............................................. G02B 27/02
[52] U.S. Cl. ..................................... 350/239; 350/247
[58] Field of Search ............................... 350/235–250; 40/362–365

[56] References Cited

U.S. PATENT DOCUMENTS

| | | | |
|---|---|---|---|
| 1,056,307 | 3/1913 | Sullivan | 350/239 |
| 1,298,686 | 4/1919 | Flanders | 350/235 |
| 1,330,777 | 2/1920 | Arnold | 350/249 |
| 2,435,741 | 2/1948 | Fleenor | 350/243 |
| 2,713,807 | 7/1955 | Herbert | 350/238 |
| 4,095,874 | 6/1978 | Wallace | 350/239 |

FOREIGN PATENT DOCUMENTS

| | | | |
|---|---|---|---|
| 1108674 | 1/1956 | France | 350/241 |
| 211187 | 7/1984 | German Democratic Rep. | 350/239 |

Primary Examiner—William H. Punter
Attorney, Agent, or Firm—Sprung Horn Kramer & Woods

[57] ABSTRACT

A hand-held microscope has two articulated members movable towards and away from each other for focusing. One member holds a specimen to be examined and has an object aperture with which the specimen is aligned during use. The other member has a lens aperture aligned with the object aperture and bears a lens member having at least two different lenses thereon and which is rotatably mounted thereon for bringing any one of the lenses into alignment with the object aperture.

6 Claims, 5 Drawing Figures

HAND-HELD MICROSCOPE

BACKGROUND OF THE INVENTION

The present invention relates to a hand-held microscope and in particular to one in which articulated members are movable towards and away from each other to focus same.

Hand-held microscopes are known in the prior art. Slide viewers with fixed focuses and which are hand-held are disclosed in U.S. Pat. Nos. 2,986,830, 3,734,596 and 3,756,699. These viewers have the disadvantage of not permitting focusing on the object being viewed and thus would be disadvantageous for use as a hand-held microscope.

Hand-held microscopes of complex construction are known from U.S. Pat. Nos. 251,721 and 2,635,504, Australian Pat. No. 131,216, German Pat. No. 898,085 and British Pat. No. 820,215. In these constructions, focusing is achieved by rotating a screw and nut assembly which effects relative movement of the lens of the microscope with respect to the object being viewed. These devices have the disadvantage of not permitting quick focusing adjustment as is generally needed when the user wants to view a large number of slides one after the other.

A quicker focusing mechanism is illustrated in U.S. Pat. Nos. 1,669,870, 3,391,975 and 4,095,874. The reading machine shown in U.S. Pat. No. 1,669,870 is sufficient for reading books or other printed materials, however the construction does not lend itself to the observing of slides and other like materials. In U.S. Pat. Nos. 3,391,975 and 4,095,874, while these are simple hand-held microscopes, they require the user to utilize both hands for focusing and observing a slide. Moreover, neither microscope is capable of adjusting the lens power thereof to be useful in a variety of applications.

SUMMARY OF THE APPLICATION

The main object of the present invention is to eliminate the disadvantages of the prior art devices and to provide a hand-held microscope with simple construction which can be operated in one hand, can be quickly focused on a slide or other object to be observed and which is capable of more than one lens power to enable the use thereof in a variety of applications including the identification of internal parasites such as Enteriobius vermicularis which are on the order of 50 to 60 microns.

These and other objects and advantages of the present invention are achieved in accordance with the present invention by a hand-held microscope having two articulated members movable towards and away from each other to achieve focusing and wherein one member has means thereof for holding a specimen to be examined adjacent an object aperture with which the specimen is aligned during use and the other member having a lens aperture aligned with the object aperture and means bearing at least two different lenses, the means being rotatably mounted on the other member for bringing any one of the lenses into alignment with the object aperture.

In a preferred embodiment of the hand-held microscope in accordance with the present invention, the means bearing the lenses comprises a transparent circular plastic disk having beads thereon forming a plurality of different lenses. The disk preferably has a knurled circumference to enable rotation by a user's finger and indicia adjacent the circumference of the disk for indicating the power of the lens aligned with the lens aperture.

The two members preferably are elongated and composed of unitary pieces of plastic which are hingedly connected intermediate the ends thereof. The members are biased into a rest position wherein the holding means and lenses are adjacent each other and wherein the biasing comprises a plastic spring member formed from one of the two members.

The slide holding means preferably comprises two spring arms integrally formed on the outer surface of the one member.

These and other objects and advantages of the present invention will be more clearly seen with reference to the attached drawings, wherein:

DETAILED DESCRIPTION OF THE INVENTION

Figure 1:
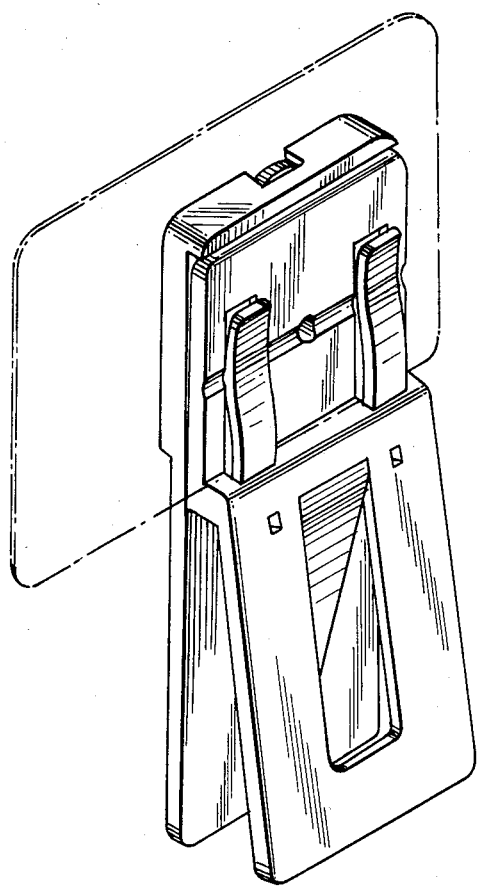
FIG. 1 is a perspective view of the hand-held microscope according to the present invention.

Referring now to FIGS. 1-5, a hand-held microscope 10 comprises two members 20 and 30. Member 20 includes a handle portion 21 and a slide holding portion 24 and member 30 includes a handle portion 31 and a lens holding portion 32. Member 20 includes hinge members 23a and 23b which form hinge apertures 230 and 231 respectively and member 30 includes hinge members 33a and 33b forming hinge apertures 330 and 331 respectively. The two members 20 and 30 are joined by pin 42 which extends through hinge apertures 230, 231, 330 and 331.

Figure 2:
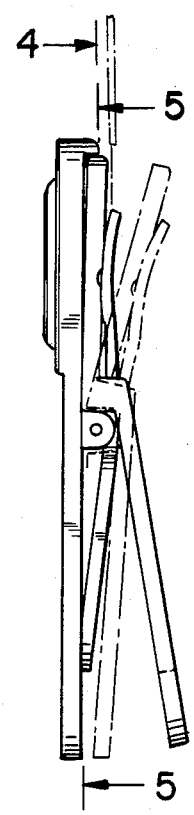
FIG. 2 is a side view of FIG. 1 with the microscope shown in the rest position in solid lines and in a focused position in phantom lines.
Figure 3:
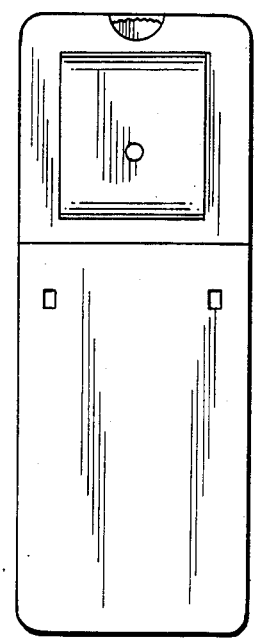
FIG. 3 is a front view of the device shown in FIG. 2.
Figure 4:
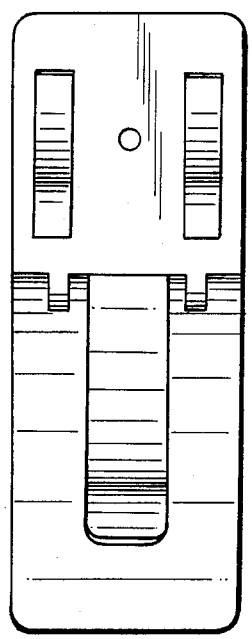
FIG. 4 is a view shown along line 4—4 in FIG. 2.
Figure 5:
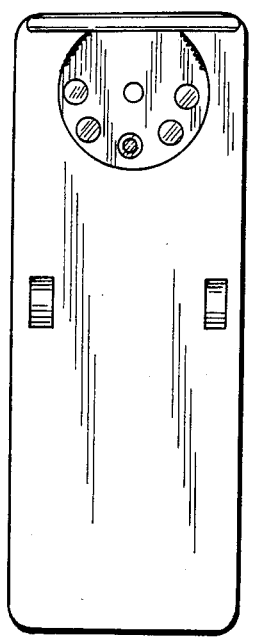
FIG. 5 is a view along line 5—5 shown in FIG. 2.

The two members 20 and 30 are biased into the position shown in FIG. 2 in solid lines by spring member 22 which is integrally formed from handle portion 21 to leave hole 29 therein. Spring member 22 maintains the members in the rest position shown in solid lines in FIG. 2, however yields against finger pressure applied to handle portions 21 and 31 during focusing to move members 20 and 30 to position such as the one shown in phantom lines in FIG. 2.

Slide holding portion 24 of member 20 preferably comprises two spring arms 28a and 28b disposed on the outer surface of member 20 and integrally formed therefrom so as to leave apertures 25a and 25b in the slide holding portion 24. Due to the arcuate cross section of spring members 28a and 28b, the outer surface of slide holding portion 24 preferably has a groove 27 therein so as to better hold a slide S in place as shown. Also formed in slide holding portion 24 is object aperture 26, with which object O on slide S is aligned for viewing.

In order to utilize the slide-holding portion 24, one merely has to insert the slide S under spring members 28a and 28b as shown in FIG. 2 to align the object O with object aperture 26.

Member 30 includes means disposed at the lens mounting portion 32 thereof for mounting at least one lens for rotation into alignment with the object aperture 26. This means includes a lens aperture 36 formed in a compartment having an outer wall 38 and an inner seat 37 in which a transparent disk 34 is rotatably received around pin 35. At a given radius from the center of the disk 34, are distributed beads 34a, 34b, 34c, 34d and 34e of different powers such as 100x, 75x, 50x, 25x and 15x respectively, which are alignable with lens aperture 36 which is in turn disposed so as to be aligned in the rest position with object aperture 26. By rotating lens disk 34, any one of the lenses 34a–34e can be aligned with lens aperture 36.

In order to easily turn the disk 34 when desired, cut away 40 is provided at the top edge 39 of member 30 to expose a preferably knurled circumference 43 of the disk 34. Also being borne on the circumference of disk 34, is indicia 41 indicating the power of the lens disposed diametrically opposite thereto on disk 34. This indicia is observable at cut out 40 and thus informs the user of the power of the lens that the user has selected and which is aligned with lens aperture 36.

In use, one inserts the slide S into the slide holding means to align the object O with the object aperture 36. One then selects a desired power for the lens to be used by rotating disk 34 via the knurled portion 41 thereof until the proper indicia appear at cut away 40. At this point, the microscope 10 is grasped with handle portions 21 and 31 between the thumb and forefinger. The microscope 10 is positioned so that the object aperture 26 is facing a source of light while the lens aperture 36 is adjacent the eye of the user. Handle portions 21 and 31 are then squeezed towards one another whereupon the lens aligned with lens aperture 36 will be focused on the object O for the user so that the object can be observed in magnified form. If it is found that the power of the lens is not suitable, the microscope can be released to the rest position and the disk 34 can be rotated to obtain a different power lens. It should be noted that the rotation of the lens while the slide S is in place, will not damage the specimen O disposed thereon, since the slide is being held on the rear surface of the member 20.

It will be appreciated that the instant specification and claims are set forth by way of illustration and not limitation, and that various modifications and changes may be made without departing from the spirit and scope of the present invention.

What is claimed is:

1. In a hand-held microscope having two articulated members movable towards and away from each other for focusing, the improvement wherein: one member has means thereon for holding a specimen to be examined and an object aperture with which the specimen is alignable during use; and the other member has a lens aperture aligned with the object aperture and means bearing at least two different lenses and rotatably mounted on the other member for bringing any one of the lens into alignment with the object aperture further comprising means biasing the two members into a rest position wherein the holding means and lenses are adjacent each other.

2. The microscope according to claim 1, wherein the means bearing the lenses comprises a transparent circular plastic disc having beads thereon forming a plurality of different lenses.

3. The microscope according to claim 2, wherein the two members are elongated and composed of plastic and are hingedly connected intermediate the ends thereof.

4. The microscope according to claim 2, wherein the disc has a knurled circumference to enable rotation by a user's finger and indicia adjacent the circumference for indicating the power of the lens aligned with the lens aperture.

5. The microscope according to claim 1, wherein the holding means comprise two spring arms disposed on the outer surface of said one member.

6. The microscope according to claim 1, wherein the spring arms are integral with the one member.

* * * * *